United States Patent
Fejfar

(10) Patent No.: US 8,130,387 B2
(45) Date of Patent: Mar. 6, 2012

(54) APPARATUS FOR SIMULATING THE EFFECTS OF PRINTING PROCESS-RELEVANT SETTING COMMANDS ON AN IMAGE TO BE PRINTED

(75) Inventor: Florian Fejfar, München (DE)

(73) Assignee: MAN Roland Druckmaschinen AG, Offenbach am Main (DE)

( * ) Notice: Subject to any disclaimer, the term of this patent is extended or adjusted under 35 U.S.C. 154(b) by 1033 days.

(21) Appl. No.: 11/639,477

(22) Filed: Dec. 15, 2006

(65) Prior Publication Data
US 2007/0139679 A1 Jun. 21, 2007

(30) Foreign Application Priority Data
Dec. 16, 2005 (DE) .......................... 10 2005 060 108

(51) Int. Cl.
*G06F 3/12* (2006.01)
(52) U.S. Cl. ...................................... 358/1.13
(58) Field of Classification Search ............. 358/1.9, 358/500, 527
See application file for complete search history.

(56) References Cited

U.S. PATENT DOCUMENTS

| 4,639,770 | A | 1/1987 | Jung et al. | |
|---|---|---|---|---|
| 2002/0145744 | A1* | 10/2002 | Kumada et al. | 358/1.9 |
| 2004/0190018 | A1* | 9/2004 | Marsden et al. | 358/1.9 |
| 2005/0128196 | A1* | 6/2005 | Popescu et al. | 345/420 |

FOREIGN PATENT DOCUMENTS

| DE | 195 06 425 | 8/1996 |
|---|---|---|
| DE | 101 21 984 | 11/2002 |

OTHER PUBLICATIONS

PHOTOGATE[4], PG-PHG-09/04-DE, Colorgate Digital Output Solutions GmbH, Göttinger Chaussee, 30459 Hannover, 2004, S.1-8 [recherchiert am Jun. 11, 2006] Im Internet:www.hpgsc.com/solutionfile/solutionfile_2230.pdf; S.4,8.

* cited by examiner

*Primary Examiner* — Benny Tieu
*Assistant Examiner* — Jeremiah Bryar
(74) *Attorney, Agent, or Firm* — Cozen O'Connor

(57) ABSTRACT

Apparatus for simulating the effects of printing process-relevant setting commands on an image to be printed image includes (a) a color management unit for transforming printing-specific image data of an image to be printed into screen-specific display data defined in an RGB target color space, wherein the image data have been defined in a CMYK source color space comprising the scale colors cyan, magenta, yellow, and black as participants in halftone combination printing; (b) at least one true color monitor for displaying the image to be printed in a true color manner on the basis of the screen-specific display data defined in the RGB target color space, the monitor being connected to the color management unit; (c) an input unit for entering the printing process-relevant setting commands for changing the image; and (d) a manipulation unit, which, on the basis of the entered setting commands, automatically adjusts the display data defined in the RGB target color space so that the image displayed on the true color monitor simulates, in a true color manner, image changes made by means of the entered setting commands.

9 Claims, 1 Drawing Sheet

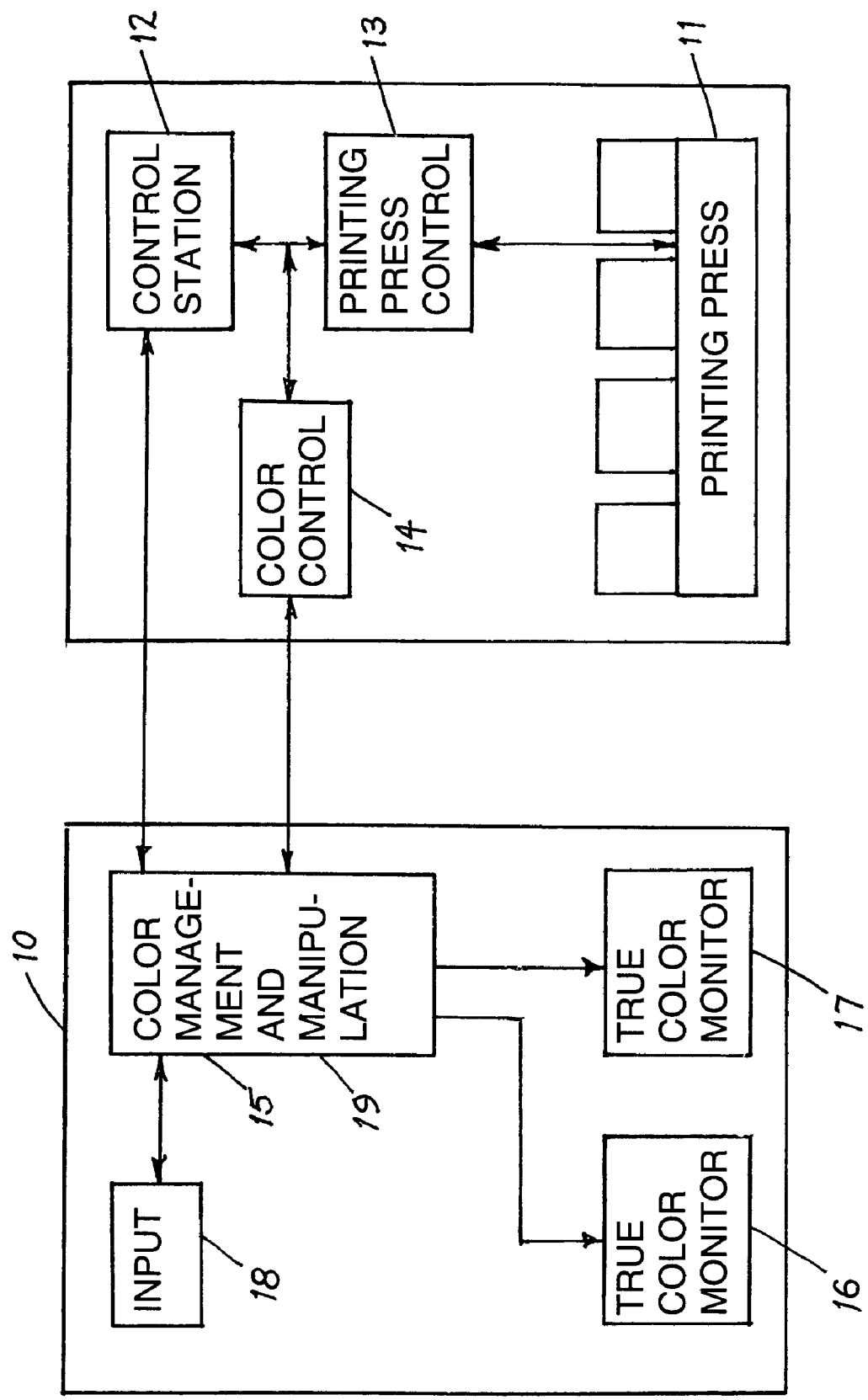

ized on a true color monitor, which guarantees that a good impression can be obtained of the print quality to be expected of the copies to be printed. If, however, during the printing operation on the printing press, it is necessary to adjust the color result of the printed copies by entering process-relevant setting commands on the printing press, it is not possible to change the color reference visualized on the true color monitor and therefore also impossible to simulate in advance, by changing the color reference, the effects which such printing process-relevant setting commands will have on the printing press before they are actually applied. Therefore, to optimize a printing order, printing process-relevant setting commands are made in practice while copies are being printed, i.e., as the printing press is running. If the entered printing process-relevant setting commands do not lead to the desired result, spoiled copies are printed with the waste of both substrate and printing ink, which ultimately leads to a considerable increase in cost. In spite of increasing standardization, it is often necessary to make changes to the print image of an order to be printed. This can be explained in part by the fact that the fine-tuning of a print order is not accomplished until the work is being carried out in the printing plant. There is therefore a need for a device by means of which the effects of printing process-relevant setting commands on an image to be printed can be reviewed or simulated independently of the actual process of printing the image on a printing press.

APPARATUS FOR SIMULATING THE EFFECTS OF PRINTING PROCESS-RELEVANT SETTING COMMANDS ON AN IMAGE TO BE PRINTED

BACKGROUND OF THE INVENTION

1. Field of the Invention

The invention pertains to a apparatus for simulating the effects of printing process-relevant setting commands on an image to be printed.

2. Description of the Related Art

In practice, a reference pattern prepared on a color ink-jet printer is generally used as a color reference during the fulfillment of a printing order on a printing press, such as on a web-fed rotary press or on a sheet-fed press, where the press operator compares the copies printed on the printing press with this reference pattern. Such reference patterns printed on a color ink-jet printer are also called "hard proofs".

It is also known according to the state of the art that, in addition to or in replacement of the reference pattern prepared on the color ink-jet printer, the color reference can be displayed on a true color monitor, where for this purpose print-specific image data of the image to be printed as defined in a CMYK source color space are transformed into display data, which are defined in an RGB target color space. The display of the color reference on a true color monitor is also referred to as a "soft proof".

The transformation of the image data present in the CMYK source color space into display data defined in the RGB target color space is also called "color space transformation". A color space transformation of this type can be carried out in the way described in U.S. Pat. No. 4,639,770.

By transforming the image data of the CMYK source color space to display data of the RGB target color space, the color reference for the printing order to be printed can be visual-

SUMMARY OF THE INVENTION

According to the invention, an apparatus for simulating the effects of printing process-relevant setting commands on an image to be printed includes at least the following:

(a) a color management unit, by means of which printing-specific image data of an image to be printed, which have been defined in a CMYK source color space consisting of at least the scale colors cyan, magenta, yellow, and black as participants in halftone combination printing, can be transformed into screen-specific display data defined in an RGB color space;

(b) at least one true color monitor connected to the color management unit, on which monitor the image to be printed can be displayed in a true color manner on the basis of the screen-specific display data defined in the RGB target color space;

(c) an input unit, by means of which the printing process-relevant setting commands for changing the print image can be entered; and (d) a manipulation unit, which, on the basis of the entered setting commands, automatically adjusts the display data defined in the RGB target color space in such a way that the print image displayed on the true color monitor simulates in a true color manner the technical printing changes made by means of the entered setting commands.

By means of the inventive apparatus, it is possible to check and to simulate, in advance, the effects which printing process-relevant setting commands will have on the image to be printed, this simulation being independent of print production on the printing press. For this purpose, the print image displayed on the true color monitor is automatically adjusted according to the invention on the basis of the printing process-relevant setting commands in such a way that the print image displayed on the true color monitor simulates the technical printing changes made by means of the entered setting commands. As a result, the number of spoiled copies and the associated costs can be reduced, and after the print image has been optimized, an updated color reference is always available in the form of a so-called "soft proof".

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole FIGURE shows a schematic functional block diagram of an inventive apparatus for simulating the effects of printing process-relevant setting commands on an image to be printed, a printing press also being shown.

DETAILED DESCRIPTION OF THE PRESENTLY PREFERRED EMBODIMENTS

Referring to the FIGURE, the inventive apparatus 10 is connected to components on the control side of a printing press 11, namely, to the control station 12 of a printing press control unit 13 and to the color control unit 14 of the printing press 11. Printing-specific image data of an image to be executed or printed on a printing press 11 in particular are stored in the color control unit 14, where these printing-specific image data are defined in a CMYK source color space consisting of the scale colors cyan, magenta, yellow, and black, which participate in halftone combination printing. The color control unit 14 makes these image data available to the printing press control unit 13, which, on the basis of these image data, ultimately controls the operation of the printing press 11 in an open-loop or closed-loop manner. The press operator can enter printing process-relevant setting commands via the control station 12 connected to the printing press control unit 13 to change the printing results being obtained.

The printing-specific image data of the image to be printed stored in the color control unit 14 and defined in the CMYK source color space are made available to a color management unit 15 of the inventive simulation apparatus 10, where the color management unit 15 transforms the image data of the image to be printed, which are defined in the CMYK source color space, into screen-specific display data, which are defined in an RGB target color space, so that a color reference can be displayed on at least one true color monitor 16 or 17 of the inventive simulation device.

The color management unit 15 executes a color space transformation from the CMYK source color space to the RGB target color space to generate screen-specific display data on the basis of the printing-specific print image data.

As shown in FIG. 1, an input unit 18 is connected to the color management unit 15. This input unit can be used to enter printing process-relevant setting commands in a manner isolated from the actual printing process on the printing press. By means of the printing process-relevant setting commands, an image to be printed can be changed, where, by means of a manipulation unit 19, which, in the present exemplary embodiment, is integrated into the color management unit 15, the display data defined in the RGB target color space can be automatically adjusted on the basis of the entered setting commands in such a way that the print image displayed on the true color monitor 16 or 17 simulates in a true color manner the technical printing changes made by means of the entered setting commands.

It is consistent with the idea of the invention that both the print image changed by the entered setting commands and the print image not affected by the setting commands and thus unchanged are displayed in parallel or simultaneously, so that it is easy in this way to make a before-and-after evaluation of the changes to the print image caused by the entered setting commands.

In the exemplary embodiment shown here, the two true color monitors 16 and 17 are used for this purpose, where the print image which has been influenced by the input of the setting commands and thus changed is displayed on a first monitor 16, whereas the print image which has not been influenced by the setting commands and is thus unchanged is displayed on the second monitor 17. According to a different approach, it is also possible to display both the print image which has been changed by the setting commands and the unchanged print image on the same monitor.

When, on the basis of the setting commands entered via the input unit 18, the print image has been adjusted or changed in the desired way, the setting commands can be made available by the input unit 18 to the control station 12 of the printing press 11, so that these commands can be accepted for the open-loop or closed-loop control of the printing process on the printing press 11.

It is therefore possible by the use of the invention, in a manner isolated from the printing process on the printing press, to simulate the effects of printing process-relevant setting commands by automatically changing the print image displayed on a true color monitor. The setting commands for controlling the printing process on the printing press are accepted only after these changes to the print image correspond to the desired result. Simultaneously, an updated color reference for the print image of the print order reflecting the changes or optimizations achieved by the setting commands is also obtained.

In the exemplary embodiment shown in FIG. 1, the inventive simulation apparatus is designed as a so-called "stand-alone" device, so that the effects of printing process-relevant setting commands can be simulated off-line from the printing press. It is also possible to integrate the inventive simulation apparatus into the control station of the printing press; in this case, in contrast to the illustrated exemplary embodiment, there is no need for a separate input unit. Instead, it is then possible, when the inventive simulation apparatus is integrated into the control station of a printing press, to enter printing process-relevant setting commands via the input units of the control station itself. In this case, the true color monitor or each true color monitor is then also a component of the control station. When the inventive simulation apparatus is integrated into the control station of the printing press, the effects of the printing process-relevant actuating commands are still stimulated in isolation from the printing process on the printing press; thus these setting commands are not used for the open-loop or closed-loop control of the printing process on the printing press until the simulation displays a satisfactory print image.

The main printing process-relevant setting commands which can be changed are the final density values or surface coverage values at least for the scale colors cyan, magenta, yellow, and black participating in halftone combination printing. It is possible to change the final density values or surface coverage values either for all color zones as a whole and/or for all color zones individually.

On the basis of the setting command-caused change in the final density values or surface coverage values, the manipulation unit 19 adjusts the display data of the RGB target color space automatically in such a way that full-tone values or tone value ranges are changed in the RGB color space. The extent of the adjustments to the full-tone values or tone value ranges to be made in the RGB target color space depends on the printing conditions and is to be determined by experiment.

If, for example, the final density is increased for the printing color cyan, the manipulation unit 19 will in particular raise the tone value of the red channel in the RGB color space, both in the full-tone range and in the entire tone value range, with appropriately adjusted weighting.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. Apparatus for simulating the effects of printing process-relevant setting commands on an image to be printed on a printing press, said apparatus comprising:

a color management unit for transforming printing-specific image data of an image to be printed into screen-specific display data defined in an RGB target color space, wherein said image data have been defined in a CMYK source color space comprising the scale colors cyan, magenta, yellow, and black as participants in halftone combination printing;

at least one true color monitor for displaying the image to be printed in a true color manner on the basis of the screen-specific display data defined in the RGB target color space, said at least one monitor being connected to the color management unit;

an input unit for entering the printing process-relevant setting commands for changing the image in isolation from the printing press, wherein the printing-process-relevant setting commands are commands for controlling the printing process on the printing press and are at least one of a final density and surface coverage; and a manipulation unit, which simulates the effects of the entered setting commands by automatically adjusting the display data defined in the RGB target color space on the basis of the entered setting commands so that the image displayed on the true color monitor simulates, in a true color manner isolated from the printing process, image changes made by the entered setting commands, whereby an updated color reference for the print image reflecting at least one of changes and optimizations achieved by the setting commands is obtained, wherein the printing process setting commands are at least one of final density and coverage, and wherein the setting commands cause a change in at least one of the final density values and the surface coverage values, whereby the manipulation unit is configured to adjust the display data of the RGB target color space automatically such that at least one of full-tone values and tone value ranges are changed in the RGB color space, the adjustments depending on the printing conditions.

2. The apparatus of claim 1 wherein said at least one monitor can display both an original image which has not been influenced by the setting commands and the image as changed by the setting commands.

3. The apparatus of claim 2 wherein two separate true color monitors respectively display the original image which has not been influenced by the setting commands and the image as changed by the setting commands.

4. The apparatus of claim 2 wherein a single said true color monitor displays both the original image which has not been influenced by the setting commands and the image as changed by the setting commands.

5. The apparatus of claim 1 wherein, by means of the entered setting commands, one of final density values and surface coverage values for the scale colors cyan, magenta, yellow, and black participating in halftone combination printing can be changed for all color zones.

6. The apparatus of claim 5 wherein, when a final density value or a surface coverage value for at least one said scale color is changed in response to a setting command, the manipulation unit automatically adjusts full tone values or tone value ranges of at least one color channel or the RGB target color space as display data.

7. The apparatus of claim 1 wherein the manipulation unit is integrated into the color management unit.

8. The apparatus of claim 1 wherein said apparatus is integrated into a control station of a printing press.

9. The apparatus of claim 1 wherein the manipulation unit is further configured to adjust a tone value of one or more of the RGB channels in the RGB color space, both in full-tone range and in entire tone value range, with appropriately adjusted weighting final density, for a corresponding color change in the CMYK color space.

* * * * *

UNITED STATES PATENT AND TRADEMARK OFFICE
CERTIFICATE OF CORRECTION

PATENT NO. : 8,130,387 B2
APPLICATION NO. : 11/639477
DATED : March 6, 2012
INVENTOR(S) : Florian Fejfar Page 1 of 1

It is certified that error appears in the above-identified patent and that said Letters Patent is hereby corrected as shown below:

Title page should read

--(73) Assignee:   manroland AG ~~MAN Roland Druckmaschinen AG~~
Offenbach am Main (DE)--

Signed and Sealed this
Tenth Day of July, 2012

David J. Kappos
*Director of the United States Patent and Trademark Office*